United States Patent
Piestert et al.

(10) Patent No.: US 11,248,105 B2
(45) Date of Patent: Feb. 15, 2022

(54) USE OF A BRANCHED POLYESTER

(71) Applicant: BYK-Chemie GmbH, Wesel (DE)

(72) Inventors: Frederik Piestert, Wesel (DE); Lee Robyn Gunning, Wesel (DE); Dennis Levering, Wesel (DE); Torsten Oelmann, Wesel (DE); Christian Biecker, Wesel (DE); Sascha Kockoth, Wesel (DE); Thorsten Kröller, Wesel (DE)

(73) Assignee: BYK-CHEMIE GMBH, Wesel (DE)

( * ) Notice: Subject to any disclaimer, the term of this patent is extended or adjusted under 35 U.S.C. 154(b) by 119 days.

(21) Appl. No.: 16/639,797

(22) PCT Filed: Aug. 20, 2018

(86) PCT No.: PCT/EP2018/072402
§ 371 (c)(1),
(2) Date: Feb. 18, 2020

(87) PCT Pub. No.: WO2019/038216
PCT Pub. Date: Feb. 28, 2019

(65) Prior Publication Data
US 2020/0207946 A1    Jul. 2, 2020

(30) Foreign Application Priority Data
Aug. 21, 2017   (EP) .................................. 17186998

(51) Int. Cl.
*C08K 5/11*     (2006.01)
*C08F 22/10*    (2006.01)
*C08F 18/04*    (2006.01)
*C08G 63/20*    (2006.01)

(52) U.S. Cl.
CPC ................ *C08K 5/11* (2013.01); *C08F 18/04* (2013.01); *C08F 22/1006* (2020.02); *C08G 63/20* (2013.01)

(58) Field of Classification Search
CPC ........ C08K 5/11; C08F 22/1006; C08F 18/04; C08G 63/20; C08G 63/12; C08G 63/00; C08L 101/02; C08L 63/00
See application file for complete search history.

(56) References Cited

FOREIGN PATENT DOCUMENTS

| | | |
|---|---|---|
| CN | 106188512 A | 12/2016 |
| DE | 4331229 A1 | 3/1995 |
| WO | 0125304 A1 | 4/2001 |
| WO | 02056921 A2 | 7/2002 |

OTHER PUBLICATIONS

International Search Report and Written Opinion for International Application No. PCT/EP2018/072402 dated Nov. 15, 2018.

*Primary Examiner* — Andrew J. Oyer
(74) *Attorney, Agent, or Firm* — Fitch, Even, Tabin & Flannery LLP

(57) ABSTRACT

The invention relates to the use of a branched polyester having an average of at least 2.8 terminal groups as additive for a curable pre-polymer composition, wherein the branched polyester acts as de-foaming agent.

24 Claims, No Drawings

USE OF A BRANCHED POLYESTER

The invention relates to use of a branched polyester as a de-foaming agent and as an internal release agent. The invention further relates to a curable pre-polymer composition.

In many industrial processes, foaming is an important problem. De-foaming or anti-foaming agents are known A defoamer or an anti-foaming agent is a chemical additive that reduces and hinders the formation of foam in industrial process liquids. The terms de-foaming agent and anti-foaming agents are often used interchangeably. Commonly used de-foaming agents are insoluble oils, polydimethylsiloxanes and other silicones, certain alcohols, stearates and glycols. De-foaming agents based on small scale particles like ureas are known as well. The additives are generally used to prevent formation of foam or they are added to break a foam already formed.

The production of de-foaming agents and compositions is often costly and the use of de-foaming agents contributes to the overall costs of curable pre-polymer compositions. The inclusion of de-foaming agents also increases the complexity of the overall recipe of curable pre-polymer compositions and the risk of unpredictable interactions between components.

Hence, there is a need for alternative de-foaming agents, which address the above-mentioned problems.

In accordance with the invention it has been found that a branched polyester having an average of at least 2.8 terminal groups can be used as de-foaming agent in curable pre-polymer compositions.

The branched polyester is relatively cheap and does not significantly contribute to the overall cost of the curable pre-polymer composition, yet it acts as a de-foaming agent and it improves the release of entrapped gas bubbles in curable pre-polymer formulations.

The branched polyester has an average of at least 2.8 terminal groups. Branched polyesters can be prepared by generally know methods using building blocks having an average functionality of ester-forming functional groups exceeding 2.0. Examples of suitable building blocks include polyols, polyacids, and building blocks having carboxylic acid and hydroxyl functionality. Suitable polyols include glycerol, trimethylol propane, di-trimethylol propane, pentaerythritol, and di-pentaerythritol. Suitable polyacids include citric acid, aconitic acid, trimesic acid, and trimellitic acid. Anhydrides and lower alcohol esters of the aforementioned compounds can be used as well. Dimethylol propionic acid is an example of a building block having two hydroxyl groups and one carboxylic acid group. The usage of higher functional building blocks determines the degree of branching and thus the number of end groups of the branched polyester. In a preferred embodiment, the branched polyester has an average of at least 3.1, and more preferably at least 3.5 end groups. Typically, the branched polyester has an average of at most 7.0 end groups. Preferably, the polyester has an average of at most 6.0 end groups. Generally, the branched polyester has an average number of end groups in the range of 3.5 to 5.5.

According to the invention, the branched polyester is used as an additive in a curable pre-polymer composition. Curable pre-polymer compositions are liquid or viscous compositions comprising polymer precursors, for example monomers and/or oligomers having functional groups capable of chemical curing reactions. The chemical curing reactions lead to an increase in molecular weight to transform the polymer precursors to polymers. In some embodiments, crosslinked polymers are formed by the curing reaction. The branched polyester acts as a de-foaming agent in the pre-polymer composition. The branched polyester leads to a lower degree of air entrapment in the pre-polymer composition and to a quicker release of gas bubbles which may be entrapped in the liquid pre-polymer composition during processing.

According to the invention it has been found that the branched polyester exhibits a twofold effect in the pre-polymer composition and acts as an internal release agent and as de-foaming agent. Hence, a single additive provides two beneficial functions in the pre-polymer composition. A release agent provides parting properties between a mold and a part being molded. An internal release agent is an additive which is included in a pre-polymer mixture before being molded and/or cured. A release agent reduces the adhesion between the polymer part formed and the internal surface of the mold. Hence, a release agent facilitates separation of the formed part from the mold. This prevents damage of the surface of the formed part. Additionally, release agents can make the production line faster, more economical and more profitable. Internal release agents are frequently used in the production of sheet molding compounds, bulk molding compounds, and pre-polymer compositions which are compression molded in metal dies. Also, many injection molding and infusion operations make use of internal release agents. Typical release agents used for all these applications mentioned are salts of stearic acid but also linear fatty alcohol ethoxylate phosphates.

In a preferred embodiment, a proportion of the terminal groups of the branched polyester used according to the invention is terminated by hydrocarbyl groups having from 8 to 40, preferably 10 to 30, carbon atoms. Typically, at least 50%, preferably at least 70% of the terminal groups are terminated by such hydrocarbyl groups. It is possible that substantially all or all terminal groups of the branched polyester are terminated by hydrocarbyl groups having 8 to 40 carbon atoms. Alternatively, at most 95%, or at most 90% of the terminal groups are terminated by hydrocarbyl groups having 8 to 40 carbon atoms.

The hydrocarbyl groups may be aliphatic or aromatic, and they may be or comprise linear, branched, or cyclic groups. The hydrocarbyl groups may be saturated or unsaturated. In some embodiments, the hydrocarbyl groups contain one or more ethylenically unsaturated groups. In a preferred embodiment, the terminal hydrocarbon groups comprise the residues of fatty acids and/or fatty alcohols having 10 to 30 carbon atoms.

The branched polyester used according to the invention generally has a number average molecular weight Mn in the range of 1200 to 15000. Generally, the Mn of the branched is at least 1500, or at least 1700. Suitably, the Mn does not exceed 12000, or 9000. Preferably, the Mn ranges from 1600 to 10.000. The polydispersity (weight average molecular weight divided by number average molecular weight) of the branched polyester generally ranges from 1.8 to 6.0. Preferably, the polydispersity is in the range of 2.4 to 4.8.

The molecular weight is expressed in g/mol and suitably determined by gel permeation chromatography, using tetrahydrofuran as eluent and polystyrene as calibration standard.

According to the invention the branched polyester is added to the pre-polymer composition in an amount of 0.1 to 15.0% by weight, calculated on the weight of the total pre-polymer composition. Generally, the amount of branched polyester in the pre-polymer composition is at least 0.5, preferably at least 1.5, and most preferred at least 2.5% by weight, for example 3.0 or 4.0% by weight.

Generally, the amount of branched polyester in the pre-polymer composition does not exceed 12.5, preferably 10.0% by weight.

In order to facilitate mixing of the branched polyester and the pre-polymer composition, the branched polyester is preferably provided as a liquid. Depending on the building blocks and molecular weight of the branched polyester, this material may have a sufficiently low viscosity as such to allow easy mixing of the branched polyester and the pre-polymer composition. In other embodiments the branched polyester is provided as a solution in an organic solvent. Preferably, the solvent is a non-volatile solvent. Non-volatile solvents generally have a boiling point above 250° C., preferably above 300° C. at atmospheric pressure. Examples of suitable solvents include esters or mixtures of esters having a sufficiently high boiling point. Esters of fatty acids and an alcohol having at least 6 carbon atoms, for example 6 to 16 carbon atoms, have been found very suitable for dissolving the branched polyester used according to the invention. A specific example of a suitable solvent is isotridecyl stearate. The amount of solvent used depends on the viscosity reduction required. Generally, the amount of solvent is in the range of 8 to 50%, more specifically 12 to 28% by weight, calculated on the amount of branched polyester.

The curable pre-polymer composition is a liquid or viscous composition comprising monomeric or oligomeric molecules having functional groups. The functional groups are capable of chemical reactions to increase the molecular weight of the monomeric or oligomeric molecules. These reactions thus lead to a cured polymer which generally is solid. The cured polymer may be crosslinked or non-crosslinked. The chemical reaction of the functional groups may be triggered in various ways.

In some embodiments, the curable pre-polymer composition is provided as a two- or more component composition, wherein the components comprise mutually reactive functional groups which are mixed prior to use. Examples include epoxide groups, which are reactive with amine groups, hydroxyl groups, or carboxylic acid groups; isocyanate groups which are reactive with amine, hydroxyl, or thiol groups; and electron deficient ethylenically unsaturated groups which are reactive with amine groups or thiol groups. In a further embodiment, the functional groups are radically polymerizable functional groups. In that case, the curing reaction is a radical polymerization reaction which can be triggered by radical generating initiators, such as peroxides, or by actinic radiation, such as UV radiation or electron beam radiation, or by combinations thereof.

In a specific embodiment, the curable pre-polymer composition comprises an unsaturated polyester base and a polymerizable monomer diluent, such as styrene or an acrylic or methacrylic monomer.

In addition to the monomeric or oligomeric molecules having functional groups, the curable pre-polymer composition may comprise other ingredients which are typically present in such compositions. Examples of such ingredients include organic or inorganic particulate fillers, pigments, dispersants or dispersing aids, stabilizers, such as UV stabilizers, and fibers.

The invention further relates to a curable pre-polymer composition comprising a curable pre-polymer and a branched polyester having an average of at least 2.8 terminal groups, wherein the terminal groups comprise the residues of fatty acids and/or fatty alcohols having 10 to 30 carbon atoms. The branched polyester is present in an amount of 2.5 to 15.0% by weight, calculated in the weight of the curable pre-polymer composition. The composition further comprises a solvent having a boiling point above 250° C. at atmospheric pressure.

The invention also relates to a process of simultaneously improving the release properties and the de-foaming characteristics of a curable pre-polymer composition comprising a curable pre-polymer, comprising the step of adding to the curable pre-polymer composition a branched polyester having an average of at least 2.8 terminal groups.

EXAMPLES

Preparation of Branched Polyesters

General Procedure for Preparation of Branched Polyesters

The raw materials indicated in Table 1 were mixed at room temperature and subsequently heated to 220° C. Water was distilled off and heating was continued until an acid value below 10 mg KOH/g was reached, determined according to DIN EN ISO 2114. Vacuum was applied to remove residual water and the reaction mixture was cooled to room temperature.

TABLE 1

Raw material for preparation of branched polyesters

| Product | Amount of Catalyst | Catalyst | Amount of monofunctional Component | Monofunctional Component | Amount of multifunctional Components | Multifunctional Components |
|---|---|---|---|---|---|---|
| A | 0.32 g | Dodecylbenzene sulfonic acid | 70.0 g | Tall oil fatty acid | 16.3 g<br>17.3 g | Pentaerythritol<br>Sebacic acid |
| B | 0.32 g | Dodecylbenzene sulfonic acid | 71.0 g | Tall oil fatty acid | 22.0 g<br>17.3 g | Trimethylolpropane<br>Adipic acid |
| C | 0.32 g | Dodecylbenzene sulfonic acid | 72.0 g | Oleic acid | 15.2 g<br>12.5 g | Pentaerythritol<br>Adipic acid |
| D | 0.32 g | Dodecylbenzene sulfonic acid | 72.0 g | Oleic acid | 15.2 g<br>10.2 g<br>7.0 g | Pentaerythritol<br>Adipic acid<br>Sebacic acid |
| E | 0.32 g | Dodecylbenzene sulfonic acid | 67.5 g | Oleyl alcohol | 28.6 g<br>10.1 g | Trimellitic acid anhydride<br>Hexane diol |
| F | 0.32 g | Dodecylbenzene sulfonic acid | 54.0 g | Myristyl alcohol | 28.6 g<br>10.1 g | Trimellitic acid anhydride<br>1,6-Hexane diol |

The effectiveness of the branched polyesters A to F summarized above as de-foaming agents was tested in different resin systems. The raw materials used for testing are mentioned in Table 2 below:

TABLE 2

| Raw material | Description |
| --- | --- |
| Epikote Resin MGS RIM R 135 | Epoxy resin based on Bisphenol A, Momentive |
| Epikure Curing Agent MGS RIM H 137 | Amine Hardener, Momentive |
| Atlac Premium 100 | Styrene-free Vinyl ester resin, Aliancys |
| Palatal P4-01 | Polyester resin, Aliancys |
| Laromer 8986 | Modified Epoxyacrylate, BASF |
| Irgacure 500 | UV - initiator, BASF |
| Laromer DPGDA | Dipropylene glycol diacrylate, BASF |
| Accelerator NL-49P | Cobalt(II) 2-ethylhexanoat 1% Cobalt, Akzo Nobel |
| Butanox LPT-IN | Initator based on methyl ethyl ketone peroxide, AkzoNobel |
| Butanox M 50 | Initator based on methyl ethyl ketone peroxide, AkzoNobel |
| Saertex X-E | 830 g/m$^2$ - 1260 mm biaxial glass matt, Saertex |
| Calcium Stearate | CAS-Nr.: 1592-23-0 |
| Zink stearate | CAS-Nr.: 557-05-1 |
| Isotridecyl stearate | CAS-Nr.: 31565-37-4 |

Test System 1

To 100 g of Epikote Resin MGS RIM R 135 was added the test substance (amount and description: see Table 3). The mixture was stirred by hand until the mixture was homogeneous. Afterwards, 30 g of Epikure Curing Agent MGS RIM H 135 was added. This mixture was stirred using a dissolver (Pendraulik TD 100, Dissolver plate diameter: 40±10 mm) for 60 seconds±10 seconds with a speed of 2800 rpm±250 rpm to create foam. 50 g±1 g of the final mixture was transferred to a cylindric glass tube and the filling level including foam was determined. Based on the filling height with foam, the samples were rated with marks from 1 (very good defoaming properties, low foam height) to 5 (poor defoaming properties, high foam height).

TABLE 3

| Exp.-No. | Test Substance | Amount Test Substance | Rating defoaming properties |
| --- | --- | --- | --- |
| 1 | A | 0.1 g | 2 |
| 2 | A | 0.3 g | 1-2 |
| 3 | A | 0.5 g | 1-2 |
| 4 | B | 0.3 g | 1 |
| 5 | C | 0.1 g | 2 |
| 6 | C | 0.3 g | 1-2 |
| 7 | D | 0.3 g | 2 |
| 8 | E | 0.1 g | 2-3 |
| 9 | E | 0.3 g | 1 |
| 10 | F | 0.3 g | 3 |
| 11* | None | | 5 |
| 12* | Calcium stearate | 0.3 g | 5 |
| 13* | Calcium stearate | 0.5 g | 5 |
| 14* | Calcium stearate | 1.0 g | 5 |
| 15* | Zink stearate | 0.5 g | 5 |
| 16* | Zink stearate | 1.0 g | 5 |
| 17* | Isotridecyl stearate | 0.5 g | 5 |
| 18* | Isotridecyl stearate | 1.0 g | 5 |

It can be inferred from Table 3 that the branched polyesters used according to the invention in Examples 1 to 10 exhibit very useful de-foaming properties. Comparative examples 11 to 18 demonstrate that the test system is severely hampered by foam formation when no additive or other additives than those according to the invention are included.

Test Systems 2 to 4

To Part A of a system (listed in Table 4 as Part A) was added the test substance (amount and description: see Table 4). The mixture was stirred by hand until the mixture was homogeneous. Afterwards, Part B of a system (listed in Table 4 as Part B) and Part C of a system (listed in Table 4 as Part C) was added. This mixture was stirred using a dissolver (Pendraulik TD 100, Dissolver plate diameter: 40±10 mm) for 60 seconds±10 seconds with a speed of 2800 rpm±250 rpm to homogenize and to create foam.

Directly after stirring the material was poured out on a polyester sheet. After 30 seconds the surface of the material was covered by a second polyester sheet and the mixture was cured between the sheets.

After curing, the two sheets were removed and panels of 10×10 cm were cut out of the material. The panels were rated by comparing the total amount of air bubbles entrapped in the panel with marks from 1 (very good defoaming properties, nearly no bubbles entrapped) to 5 (poor defoaming properties, many air bubbles entrapped).

Test System 2

| | |
| --- | --- |
| Part A | Atlac Premium 100 |
| Part B | Accelerator NL-49P |
| Part C | Butanox LPT-IN |

Test System 3

| | |
| --- | --- |
| Part A | Palatal P4-01 |
| Part B | Accelerator NL-49P |
| Part C | Butanox M 50 |

Test System 4

| | |
| --- | --- |
| Part A | Laromer 8986 |
| Part B | Dipropylene glycol diacrylate |
| Part C | Irgacure 500 |

TABLE 4

| Exp.-No. | Test system | Amount Part A | Amount Test Substance | Test Substance | Amount Part B | Amount Part C | Rating defoaming properties |
|---|---|---|---|---|---|---|---|
| 19 | 2 | 100 g | 0.3 g | A | 2 g | 2 g | 3-4 |
| 20 | 2 | 100 g | 0.3 g | C | 2 g | 2 g | 3-4 |
| 21 | 2 | 100 g | 0.3 g | D | 2 g | 2 g | 4 |
| 22 | 2 | 100 g | 0.3 g | F | 2 g | 2 g | 3-4 |
| 23* | 2 | 100 g | — | — | 2 g | 2 g | 5 |
| 24* | 2 | 100 g | 0.3 g | Calcium stearate | 2 g | 2 g | 5 |
| 25* | 2 | 100 g | 0.3 g | Isotridecyl stearate | 2 g | 2 g | 5 |
| 26 | 3 | 100 g | 0.3 g | B | 1 g | 2 g | 4 |
| 27 | 3 | 100 g | 0.3 g | C | 1 g | 2 g | 3 |
| 28 | 3 | 100 g | 0.3 g | D | 1 g | 2 g | 2-3 |
| 29 | 3 | 100 g | 0.3 g | E | 1 g | 2 g | 3-4 |
| 30 | 3 | 100 g | 0.3 g | F | 1 g | 2 g | 3 |
| 31* | 3 | 100 g | 0.3 g | — | 1 g | 2 g | 5 |
| 32* | 3 | 100 g | 0.3 g | Calcium stearate | 1 g | 2 g | 5 |
| 33* | 3 | 100 g | 0.3 g | Isotridecyl stearate | 1 g | 2 g | 5 |
| 34 | 4 | 65 g | 0.3 g | C | 30 g | 5 g | 2 |
| 35* | 4 | 65 g | — | — | 30 g | 5 g | 5 |
| 36* | 4 | 65 g | 0.3 g | Isotridecyl stearate | 30 g | 5 g | 5 |

It can be inferred from Table 4 that the branched polyesters used according to the invention in Examples 19 to 22, 26 to 30, and 34 exhibit very useful de-foaming properties. Comparative examples 23 to 25, 31 to 33, 35, and 36 demonstrate that the test system is severely hampered by foam formation when no additive or other additives than those according to the invention are included.

Test of Mold Release Properties

Two layers of glass fabrics (Saertex X-E-830 g/m², roving PPG 2002 (dimension: 350×350 mm)) were placed in an infusion mold (40×40 cm inner diameter, Aluminum, surface hard anodized, encircling seals in the top and bottom half of the mold, vacuum applied from the top outlet via hose; four resin inlets on the bottom half of the mold, resin inlet via hose) and vacuum was applied until a pressure of at least 10 mbar was achieved.

A homogeneous mixture of 100 parts Epikote Resin MGS RIMR 135, the test substance (amount and description: see Table 5) and 30 parts of Epikure Curing Agent MGS RIM H 137 that was freshly mixed using a Dispermat TYPE CN 40 F2 (Dissolver plate diameter: 40±10 mm) for 300 seconds±10 seconds with a speed of 930 rpm±50 rpm using a vacuum of 50 mbar±5 mbar.) was infused over the four hoses on the bottom side until the liquid resin mixture appeared in the hose on the top side.

After infusion, the hoses were sealed on the in- and outlet with a plug and the entire mold with hoses was placed in a convection oven to cure the panel for 10 h at 80° C.

Afterwards, the mold was opened and the cured panel was removed. The force to demold the panel was compared within the different trials.

The force needed to demold the panel was rated with marks from 1 (very easy demolding, no force needed) to 5 (poor demolding, fracture in the panel during demolding).

TABLE 5

| Exp.-No. | Test Substance | Amount Test Substance | Rating mold release |
|---|---|---|---|
| 37 | A | 1 g | 2-3 |
| 38 | A | 2 g | 1 |
| 39 | A | 3 g | 1 |
| 40 | C | 1 g | 2-3 |
| 41 | C | 2 g | 2 |
| 42 | C | 3 g | 1 |
| 43 | D | 1 g | 2 |
| 44 | D | 2 g | 1 |
| 45 | E | 1 g | 2 |
| 46 | E | 2 g | 1-2 |
| 47 | F | 1 g | 2 |
| 48 | F | 2 g | 1-2 |
| 49* | Calcium stearate | 2 g | 3-4 |
| 50* | Calcium stearate | 3 g | 2 |
| 51* | Zink stearate | 3 g | 2 |
| 52* | Isotridecyl stearate | 3 g | 2-3 |
| 52* | — | — | 5 |

From Table 5 it can be inferred that the branched polyesters used according to the invention in Examples 37 to 48 are very effective as internal mold release agents. They are effective when used in small amounts and provide equal or better mold release properties than known internal release agents used according to comparative Examples 49 to 52. Thus, the branched polyesters have a twofold beneficial effect, because they act as mold release agent and as de-foaming agent when used according to the invention.

The invention claimed is:
1. A method of modifying a curable pre-polymer composition, the method comprising:
   adding an additive to the curable pre-polymer composition, the additive comprising a branched polyester having an average of at least 2.8 terminal groups, wherein the branched polyester acts as a de-foaming agent;
   wherein the additive comprises a solution of the branched polyester in a solvent having a boiling point above 250° C. at atmospheric pressure.

2. The method according to claim 1, wherein the branched polyester acts as an internal release agent and as the de-foaming agent.

3. The method according to claim 1, wherein the branched polyester has an average of at least 3.1 terminal groups.

4. The method according to claim 1, wherein at least 50% of the terminal groups of the branched polyester are terminated by hydrocarbyl groups having from 8 to 40 carbon atoms.

5. The method according to claim 1, wherein the terminal groups comprise residues of fatty acids having 10 to 30 carbon atoms.

6. The method according to claim 1, wherein the terminal groups comprise residues of fatty alcohols having 10 to 30 carbon atoms.

7. The method according to claim 1, wherein the branched polyester has a number average molecular weight in the range of 1500 to 15000.

8. The method according to claim 1, wherein the branched polyester is added to the curable pre-polymer composition in an amount of 0.1 to 15.0% by weight, calculated on the weight of the curable pre-polymer composition.

9. The method according to claim 1, wherein the solvent is an ester of a fatty acid and an alcohol having at least 6 carbon atoms.

10. The method according to claim 1, wherein the curable pre-polymer composition comprises curable functional groups comprising one or more of ethylenically unsaturated groups, epoxide groups, isocyanate groups, hydroxyl groups, amine groups, and carboxylic acid groups.

11. The method according to claim 1, wherein the curable pre-polymer composition comprises one or more additional components selected from fillers, pigments, stabilizers, dispersants, and fibers.

12. A curable pre-polymer composition comprising
  i) a curable pre-polymer,
  ii) a branched polyester having an average of at least 2.8 terminal groups, wherein the terminal groups comprise residues of fatty acids and/or fatty alcohols having 10 to 30 carbon atoms, and wherein the branched polyester is present in an amount of 2.5 to 15.0% by weight, calculated on the weight of the curable pre-polymer composition, and
  iii) a solvent having a boiling point above 250° C. at atmospheric pressure.

13. The method according to claim 1, wherein at least 70% of the terminal groups of the branched polyester are terminated by hydrocarbyl groups having from 8 to 40 carbon atoms.

14. A method of modifying a curable pre-polymer composition, the method comprising:
  adding an additive to the curable pre-polymer composition, the additive comprising a branched polyester having an average of at least 2.8 terminal groups, wherein the branched polyester acts as a de-foaming agent;
  wherein the additive comprises a solution of the branched polyester in a solvent having a boiling point above 250° C. at atmospheric pressure;
  wherein the terminal groups comprise residues of fatty alcohols having 10 to 30 carbon atoms.

15. The method according to claim 14, wherein the branched polyester acts as an internal release agent and as the de-foaming agent.

16. The method according to claim 14, wherein the branched polyester has an average of at least 3.1 terminal groups.

17. The method according to claim 14, wherein at least 50% of the terminal groups of the branched polyester are terminated by hydrocarbyl groups having from 8 to 40 carbon atoms.

18. The method according to claim 14, wherein the branched polyester has a number average molecular weight in the range of 1500 to 15000.

19. The method according to claim 14, wherein the branched polyester is added to the curable pre-polymer composition in an amount of 0.1 to 15.0% by weight, calculated on the weight of the curable pre-polymer composition.

20. The method according to claim 14, wherein the additive comprises a solution of the branched polyester in a solvent having a boiling point above 250° C. at atmospheric pressure.

21. The method according to claim 20, wherein the solvent is an ester of a fatty acid and an alcohol having at least 6 carbon atoms.

22. The method according to claim 14, wherein the curable pre-polymer composition comprises curable functional groups comprising one or more of ethylenically unsaturated groups, epoxide groups, isocyanate groups, hydroxyl groups, amine groups, and carboxylic acid groups.

23. The method according to claim 14, wherein the curable pre-polymer composition comprises one or more additional components selected from fillers, pigments, stabilizers, dispersants, and fibers.

24. The method according to claim 14, wherein at least 70% of the terminal groups of the branched polyester are terminated by hydrocarbyl groups having from 8 to 40 carbon atoms.

* * * * *